(12) United States Patent
Ishikawa

(10) Patent No.: US 8,028,603 B2
(45) Date of Patent: Oct. 4, 2011

(54) METHOD FOR SETTING GEAR TOOTH PROFILE IN FLAT WAVE GEAR DEVICE ON SIDE WHERE GEARS HAVE SAME NUMBER OF TEETH

(75) Inventor: Shoichi Ishikawa, Kanagawa (JP)

(73) Assignee: Harmonic Drive Systems Inc., Tokyo (JP)

( * ) Notice: Subject to any disclaimer, the term of this patent is extended or adjusted under 35 U.S.C. 154(b) by 546 days.

(21) Appl. No.: 12/273,982

(22) Filed: Nov. 19, 2008

(65) Prior Publication Data

US 2009/0139358 A1   Jun. 4, 2009

(30) Foreign Application Priority Data

Dec. 4, 2007   (JP) ................................. 2007-313630
Jan. 16, 2008  (JP) ................................. 2008-006646

(51) Int. Cl.
*F16H 33/00* (2006.01)
(52) U.S. Cl. .......................................... 74/640; 475/180
(58) Field of Classification Search .................. 74/460, 74/462, 640; 475/180, 644
See application file for complete search history.

(56) References Cited

U.S. PATENT DOCUMENTS

| | | | |
|---|---|---|---|
| 2,906,143 A | | 9/1959 | Musser |
| 4,703,670 A | * | 11/1987 | Kondo ............................ 74/640 |
| 4,974,470 A | * | 12/1990 | Ishikawa et al. ................ 74/640 |
| 5,687,620 A | * | 11/1997 | Ishikawa ......................... 74/640 |
| 5,918,508 A | * | 7/1999 | Ishikawa ......................... 74/640 |
| 6,167,783 B1 | * | 1/2001 | Ishikawa ......................... 74/640 |
| 6,526,849 B1 | * | 3/2003 | Ishikawa ......................... 74/640 |
| 7,117,759 B2 | * | 10/2006 | Ishikawa ......................... 74/461 |
| 7,328,632 B2 | * | 2/2008 | Ishikawa ......................... 74/640 |
| 7,694,607 B2 | * | 4/2010 | Ishikawa et al. ................ 74/640 |
| 7,735,396 B2 | * | 6/2010 | Ishikawa et al. ................ 74/640 |

FOREIGN PATENT DOCUMENTS

| | | |
|---|---|---|
| JP | 38-9157 | 6/1963 |
| JP | 2503027 | 3/1996 |

\* cited by examiner

*Primary Examiner* — Justin Holmes
*Assistant Examiner* — Michael Gonzalez
(74) *Attorney, Agent, or Firm* — Buchanan Ingersoll & Rooney PC

(57) ABSTRACT

In a flat wave gear device in which a flexible externally toothed gear and the rigid internally toothed gear have the same number of teeth, an arcuate tooth profile is imparted to a flexible externally toothed gear, a contact point C between tooth profiles of a flexible externally toothed gear and a D-side rigid internally toothed gear is determined from an arc center A of the arcuate tooth profile of the flexible externally toothed gear and from a momentary center S of relative movement between the gears, and a main part of a tooth profile to be formed in the D-side rigid internally toothed gear is calculated based on the contact point. The tooth profile of the D-side rigid internally toothed gear can be accurately designed; therefore, meshing between the gears can occur with zero backlash, ratcheting torque can be increased, and continuous meshing can occur across a wide range of the movement locus of the tooth profiles of both gears. The load capability of the flat wave gear device can accordingly be increased.

6 Claims, 5 Drawing Sheets

METHOD FOR SETTING GEAR TOOTH PROFILE IN FLAT WAVE GEAR DEVICE ON SIDE WHERE GEARS HAVE SAME NUMBER OF TEETH

TECHNICAL FIELD

The present invention relates to a flat wave gear device, and in particular relates to a method for setting a tooth profile of a flexible externally toothed gear and a rigid internally toothed gear that have the same number of teeth, so that a high ratcheting torque is obtained as accurate meshing is achieved with zero backlash.

BACKGROUND ART

A wave gear device is provided with a rigid internally toothed gear, a flexible externally toothed gear, and a wave generator; the wave generator typically having an elliptical outline. The wave generator causes the flexible externally toothed gear to flex into an elliptical shape, and both ends along the major axis of the elliptical shape mesh with the rigid internally toothed gear. The number of teeth of the flexible externally toothed gear is 2n less (n is a positive number) than the number of teeth in the rigid internally toothed gear. When the wave generator is caused to rotate via a motor or the like, the position in which both gears mesh moves in the circumferential direction, and counter-rotation corresponding to the difference in the number of teeth on each gear occurs between the gears. There is known a wave gear device referred to as a flat wave gear device.

In a flat wave gear device, in order to output the counter-rotation of the rigid internally toothed gear and the flexible externally toothed gear, two rigid internally toothed gears are disposed in parallel in a coaxial state, with one of the rigid internally toothed gears having the same number of teeth as the flexible externally toothed gear and the other rigid internally toothed gear having 2n more teeth than the flexible internally toothed gear. One of the rigid internally toothed gears is secured so as not to rotate, and rotation is output from the other rigid internally toothed gear.

From the original invention of the wave gear device by C. W. Musser (Patent Document 1) up to the present, a variety of inventions have been proposed by Musser and numerous other researchers. However, these inventions primarily relate to a tooth profile for cases when the flexible externally toothed gear and the rigid internally toothed gear have a different number of teeth.

Very few proposals have been made in regard to a tooth profile for a flexible externally toothed gear and a rigid internally toothed gear in the flat wave gear device when there is no difference in the number of teeth. No proposals have been made since those made in Patent Documents 2 and 3.
[Patent Document 1] U.S. Pat. No. 2,906,143
[Patent Document 2] JP-B 38-9157
[Patent Document 3] JP-B 2503027

At present, in order for perfect zero backlash to be achieved in a flat wave gear device, it is necessary for there to be zero backlash on both sides; i.e., the side on which the flexible externally toothed gear and the rigid internally toothed gear have different numbers of teeth, and the side where the gears have the same number of teeth. Particularly in the latter case, no adequate investigations have yet to be made into a tooth profile that accounts for the actual number of teeth.

SUMMARY OF THE INVENTION

A main object of the present invention is to ascertain the movement locus of teeth of the flexible externally toothed gear with respect to teeth of the rigid internally toothed gear in association with the shape of a rim neutral line of the flexible externally toothed gear in a flat wave gear device wherein both gears have the same number of teeth, and to determine an accurate tooth profile of the rigid internally toothed gear in a case where the flexible externally toothed gear has an arcuate tooth profile.

In order to accomplish the above and other objects, according to the flat wave gear device of the present invention, an arcuate tooth profile is given to a flexible externally toothed gear; a point of contact point between tooth profiles of both gears is determined from an arc center of the tooth profile of the flexible externally toothed gear and a momentary center of relative movement between the flexible externally toothed gear and a rigid internally toothed gear, with consideration given to the actual number of teeth; and a tooth profile to be formed on the rigid internally toothed gear is calculated based on the contact point.

Specifically, the present invention is a method for setting a tooth profile in a flat wave gear device, that has a D-side rigid internally toothed gear disposed in parallel in a coaxial state with an S-side rigid internally toothed gear, an annular flexible externally toothed gear disposed in a coaxial state within the D-side and the S-side rigid internally toothed gears, and a wave generator for causing a cross-section of the flexible externally toothed gear given perpendicularly with respect to the axis to flex elliptically and the resulting shape to rotate, the number of teeth on the D-side rigid internally toothed gear being the same as the number of teeth on the flexible externally toothed gear, and the number of teeth on the S-side rigid internally toothed gear having 2n more teeth (n being a positive integer) than the number of teeth on the flexible externally toothed gear, wherein the method is characterized in comprising:

using both the flexible externally toothed gear and the D-side rigid internally toothed gear as spur gears of module m;

using κmn (κ: flexing coefficient) as the degree of radial flexing on the major axis of a rim neutral line passing through a center along a thickness direction of a tooth root rim when a cross-section of the flexible externally toothed gear given perpendicularly with respect to the axis is caused to deform into an elliptical shape;

giving a main part of a tooth profile of the flexible externally toothed gear a convex arcuate tooth profile composed of a convex arc having a radius r and point A as a center;

determining a momentary center S of relative motion of the flexible externally toothed gear and the D-side rigid internally toothed gear generated accompanying rotation of the wave generator;

establishing a point at which a line segment that connects the arc center of the convex arc and the momentary center intersects the convex arc as a contact point C between the convex arcuate tooth profile of the flexible externally toothed gear and a tooth profile of the D-side rigid internally toothed gear; and using a movement locus of the contact point on the convex arcuate tooth profile of the flexible externally toothed gear accompanying rotation of the wave generator as a tooth profile of a main part of the D-side rigid internally toothed gear.

According to this aspect, there is provided a method for establishing a stationary Cartesian coordinate system (O-x, y) whose origin is a center O of the D-side rigid internally toothed gear; using the formula below to determine p using tangential polar coordinates where m is a radius of a neutral circle that is a neutral curve before deformation, w is a degree of flexing, θ is an angle between a tangent to the neutral curve at a point P on the neutral curve and an x-axis, and p is a length of a normal oriented downward from origin O on the tangent;

$$p = r_n + w \cos(2\theta) \quad (1)$$

establishing a rotating Cartesian coordinate system (O-X, Y) that also has origin O, and is configured such that the Y-axis, on being rotated over a distance φ clockwise in relation to the y-axis, passes through a hypothetical point Q on the neutral circle corresponding to point P on the neutral curve;

establishing a Cartesian coordinate system (P-$x_F$, $y_F$) in which a tangent drawn on the neutral curve at point P on the neutral curve is an $x_F$ axis, and a straight line perpendicular to the $x_F$ axis is a $y_F$ axis;

using the formula below to determine, as a function of θ, coordinates ($x_S$, $y_S$) of the momentary center S on the stationary Cartesian coordinate system (O-x, y);

$$x_S = -\frac{4 r_n \sin^3\theta}{3\cos(2\theta)} \quad (17)$$

$$y_S = \frac{4 r_n \cos^3\theta}{3\cos(2\theta)}$$

taking ($x_a$, $y_a$) as the coordinates of a center A of the convex arc on the Cartesian coordinate system (P-$x_F$, $y_F$), and using the formula below to determine coordinates ($x_A$, $y_A$) of the center A on the stationary Cartesian coordinate system (O-x, y);

$$x_A = (r_n - 1.5w + y_a)\sin\theta - 0.5w\sin(3\theta) + x_a\cos\theta$$

$$y_A = (r_n + 1.5w + y_a)\cos\theta - 0.5w\cos(3\theta) - x_a\sin\theta \quad (18)$$

using the formula below to determine stationary coordinates ($x_C$, $y_C$) of the contact point C; and $$x_C = x_A + r\cos\eta \quad (19)$$

$$y_C = y_A + r\sin\eta$$

$$\eta = \tan^{-1}\left(\frac{y_A - y_S}{x_A - x_S}\right)$$

converting the stationary coordinates ($x_C$, $y_C$), determined using the above formula, from the stationary coordinate system (O-x, y) to the rotating coordinate system (O-X, Y) fixed to the D-side rigid internally toothed gear with θ being used as a variable, and using the formula below to determine a tooth profile of a main part of the D-side internally toothed gear wherein the Y-axis is the center of a tooth space.

$$X = x_C \cos\phi - y_C \sin\phi$$

$$Y = x_C \sin\phi + y_C \cos\phi \quad (20)$$

The flexing coefficient κ can be set within a range of 0.6<κ<1.4.

The flat wave gear device of the present invention is further characterized in that a main part of a tooth profile of a flexible externally toothed gear and a main part of a tooth profile of a D-side rigid internally toothed gear are set using the above method.

EFFECT OF THE INVENTION

According to the present invention, it is possible to accurately design the tooth profile of a rigid internally toothed gear (the D-side rigid internally toothed gear) that has the same number of teeth as a flexible externally toothed gear in a flat wave gear device; therefore, meshing between the gears can occur with zero backlash. It is also possible to increase the ratcheting torque, and enable continuous meshing to occur across a wide range of the movement locus of the tooth profiles of both gears. Therefore, according to the present invention, the load capability of the flat wave gear device can be increased.

BEST MODE FOR CARRYING OUT THE INVENTION

A method for setting a tooth profile in a flat wave gear device in which the present invention is used will be described below with reference to the attached drawings.

(Configuration of Flat Wave Gear Device)

Figure 1:
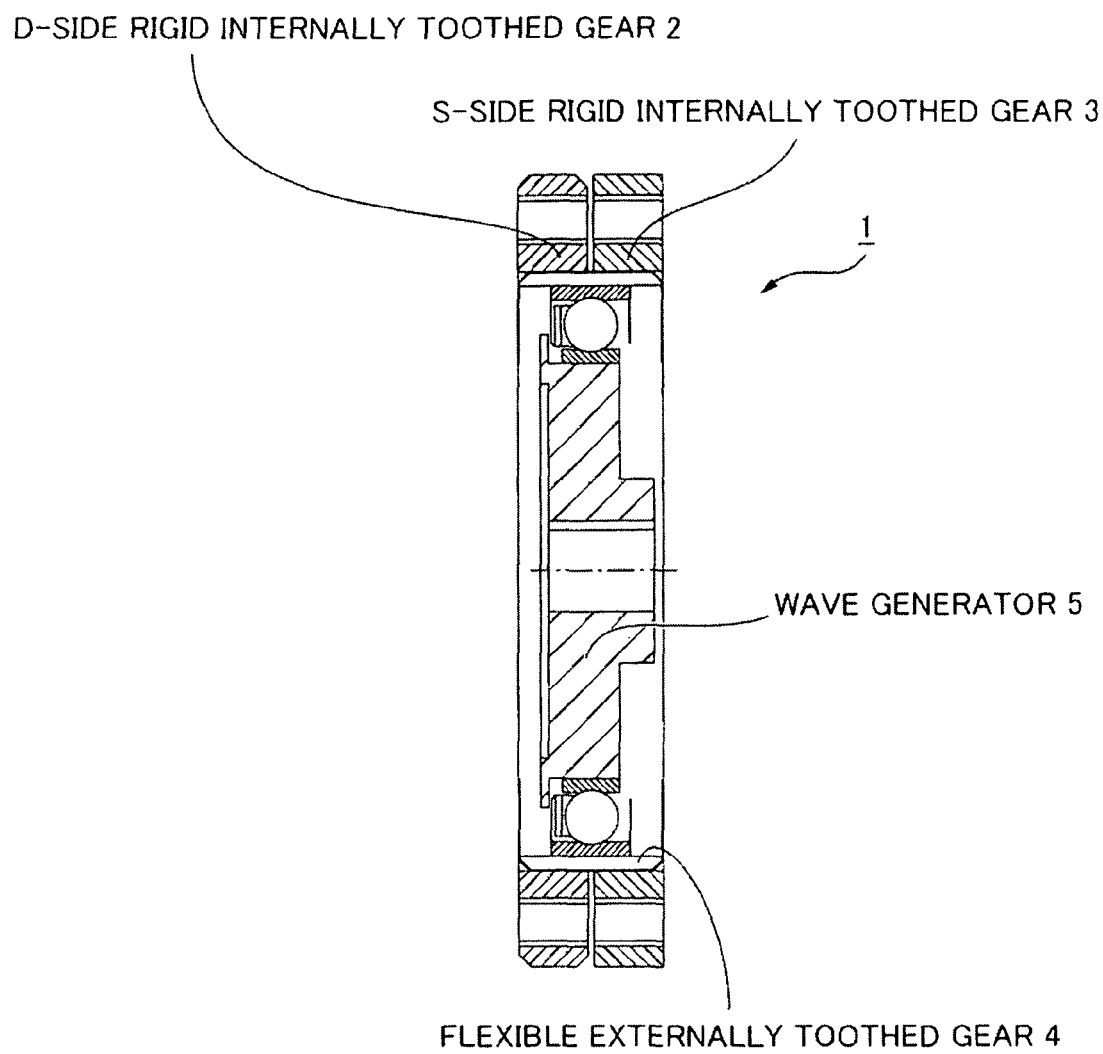
FIG. 1 is a sectional diagram showing a flat wave gear device of the present invention.

FIG. 1 is a sectional diagram showing a flat wave gear device in which the present invention can be used. A flat wave gear device 1 has two rigid internally toothed gears 2, 3 disposed in parallel in a coaxial state, an annular flexible externally toothed gear 4 disposed in a coaxial state within the two rigid internally toothed gears, and a wave generator 5 having an elliptical outline fitted within the flexible externally toothed gear. The rigid internally toothed gear 2 has the same number of teeth as the flexible externally toothed gear 4, but the rigid internally toothed gear 3 has 2n more teeth than the flexible externally toothed gear 4 (n being a positive integer). When the elliptically contoured wave generator 5 is caused to rotate, counter-rotation occurs between the flexible externally toothed gear 4 and the rigid internally toothed gear 3 that have a different number of teeth. For example, the rigid internally toothed gear 2 is secured so as not to rotate, and the rigid internally toothed gear 3 on the other side is supported in a rotatable state, whereby reduced-speed rotation is outputted from the side of the rigid internally toothed gear 3. In the description that follows, the rigid internally toothed gear 2 having the same number of teeth as the flexible externally toothed gear 4 is referred to as the "D-side rigid internally toothed gear," and the rigid internally toothed gear 3 is referred to as the "S-side internally toothed gear."

The rigid internally toothed gears 2, 3 and the flexible externally toothed gear 4 constitute spur gears having module m. κmn indicates the degree of radial flexing of the flexible externally toothed gear 4. Namely, κmn is the degree of radial flexing on the major axis of a rim neutral line passing through a center along a thickness direction of a tooth root rim when a cross-section of the flexible externally toothed gear given perpendicularly with respect to the axis is caused to deform into an elliptical shape, κ is a flexing coefficient, and the degree of radial flexing mn when κ=1 is a value obtained by dividing the pitch diameter of the flexible externally toothed gear by the reduction ratio when the rigid internally toothed gear is secured. The flexing coefficient falls within the practical range of 0.6<κ<1.4.

(Neutral Curve of Flexible Externally Toothed Gear)

Figure 2:
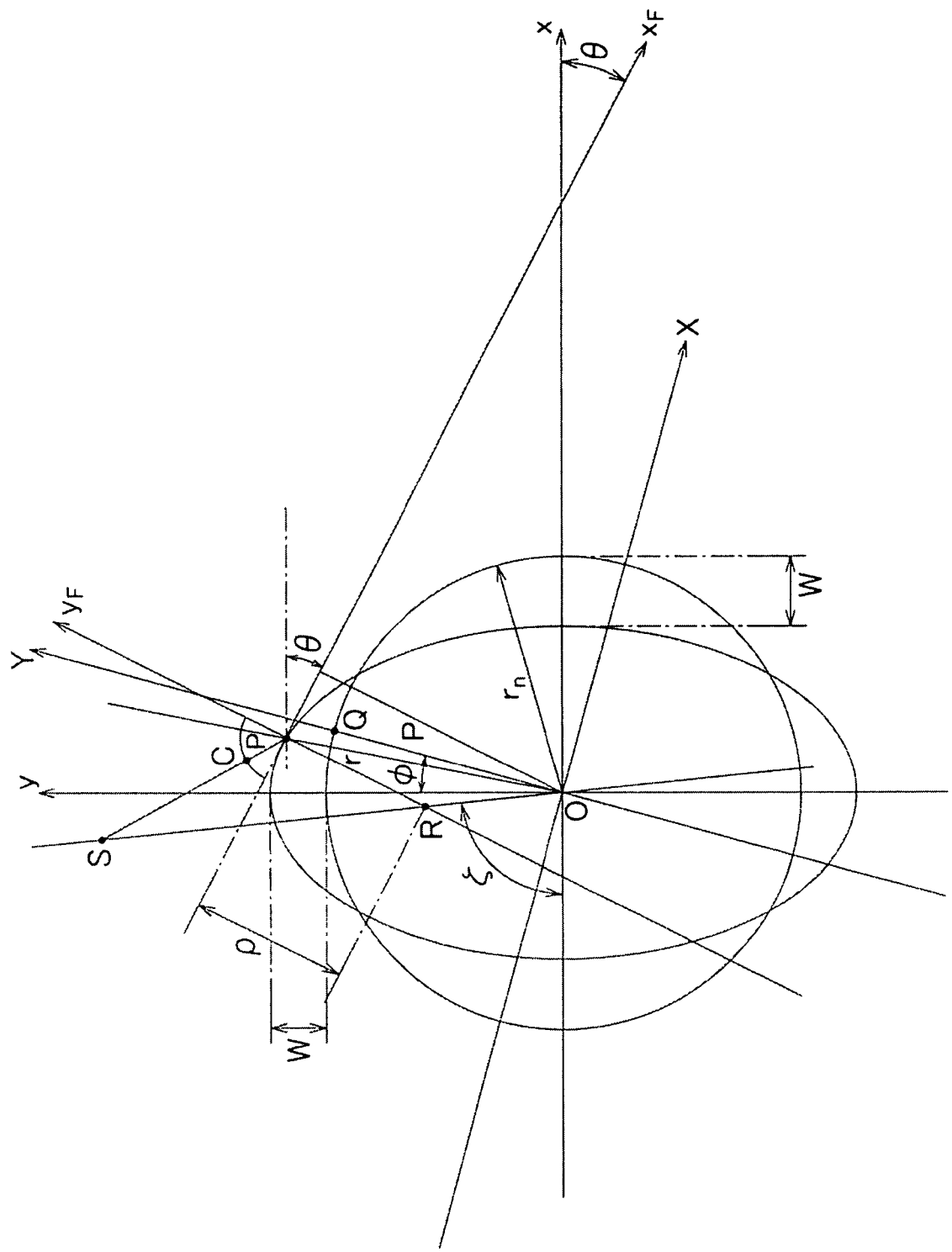
FIG. 2 is a descriptive diagram showing a procedure for setting a tooth profile according to the present invention.
Figure 3:
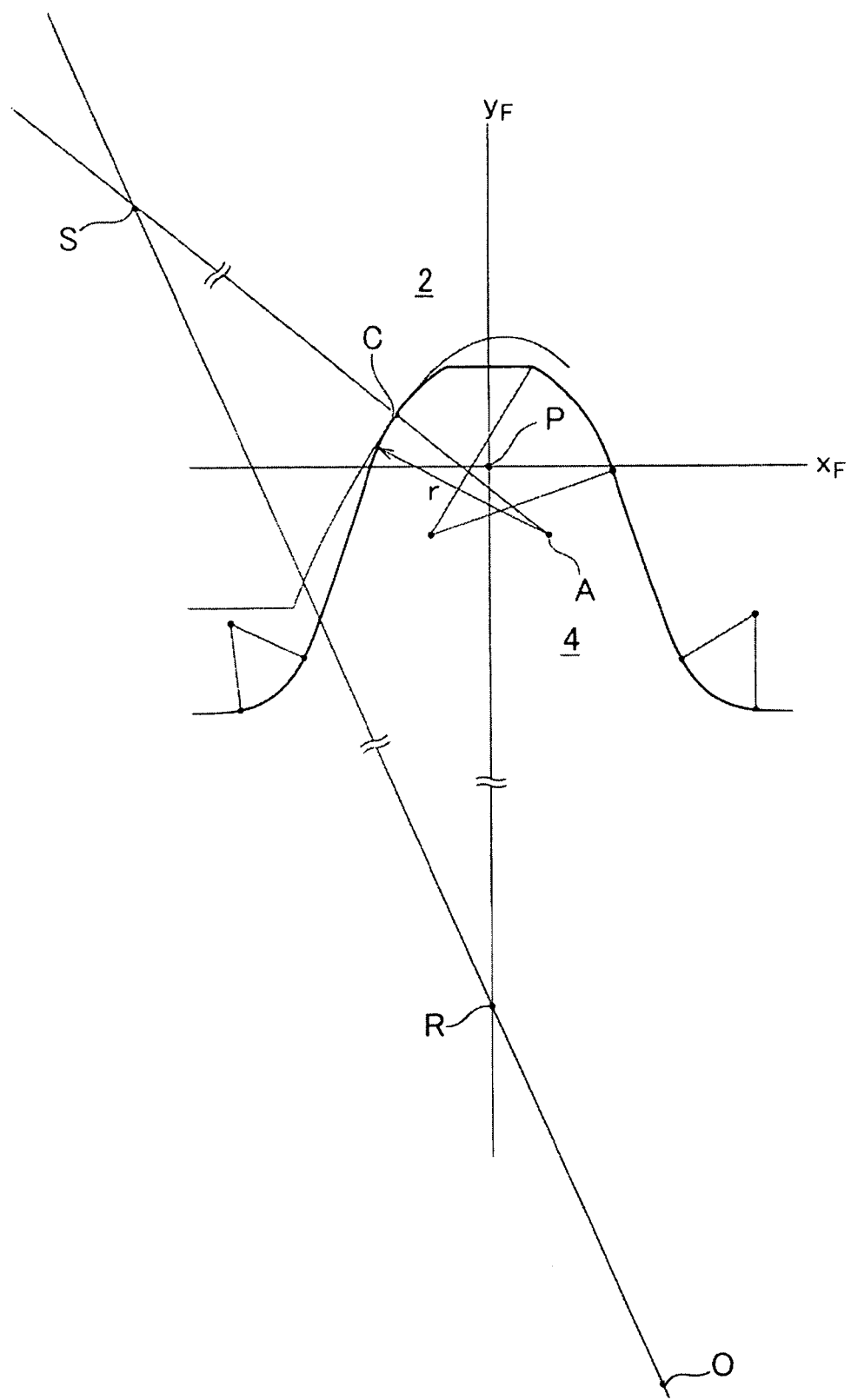
FIG. 3 is a descriptive diagram showing an enlarged view of a part in FIG. 1.

FIG. 2 is a descriptive diagram used to describe a tooth profile setting method. The drawing shows a neutral curve of a tooth bottom rim of a cross-section of the flexible externally toothed gear 4 given perpendicularly with respect to the axis. A stationary Cartesian coordinate system (O-x, y), whose origin is a center O of the D-side rigid internally toothed gear 2 (and is the same as a center of the flexible externally toothed gear 4 before deformation), is established. The major and minor axes of a neutral curve in an initial position and having an approximately elliptical shape, presumed to be described by the center of the flexible externally toothed gear 4 in the rim thickness direction, are aligned respectively with the y-axis and the x-axis. Taking $r_n$ to be a radius of a neutral circle; i.e. the neutral curve before deformation, w to be the degree of radial flexing, θ to be an angle at which a tangent to the neutral curve at a point P established on the neutral curve forms the x-axis, and p to be a length of a normal oriented downward from the origin O on the tangent, p is determined from formula (1) using tangential polar coordinates.

$$p = r_n + w \cos(2\theta) \quad (1)$$

The formula gives a curve that is approximately elliptical, and all analyses performed in the present invention are based on this formula. Using normal Cartesian coordinates (x, y) to express the shape of the neutral curve, stationary coordinates $(x_P, y_P)$ of the point P are expressed in formula (2) (the derivation of the formula is shown at the end of the present specification).

$$x_P = (r_n - 1.5w)\sin\theta - 0.5w \sin(3\theta)$$

$$y_P = (r_n + 1.5w)\cos\theta - 0.5w \cos(3\theta) \quad (2)$$

(Analysis of Movement of Tooth on Flexible Externally Toothed Gear)

In order to analyze the movement of the flexible externally toothed gear 4 on the D-side rigid internally toothed gear 2 of the flat wave gear device 1, an assumption is made, as shown in FIG. 2, of a hypothetical neutral circle of the flexible externally toothed gear prior to deformation; the circle moving concentrically and integrally with the D-side rigid internally toothed gear 2.

The letter Q denotes a point on the hypothetical neutral circle of the flexible externally toothed gear 4 corresponding to the point P on the neutral curve. The correlation between points P and Q is such that when the point P is on the major axis of the approximated ellipse, the point Q will also be on a radius in the same direction; when the point P moves along the neutral curve at an even speed, the point Q also moves on the neutral circle at the same even speed; and when the point P has traveled the entirety of the neutral curve, the point Q will also have traveled the entirety of the neutral circle.

The coordinates $(x_Q, y_Q)$ of the point Q on the stationary Cartesian coordinate system are determined by formula (3), taking φ be an angle of deflection from the major axis on a polar display.

$$x_Q = r_n \sin\phi$$

$$y_Q = r_n \cos\phi \quad (3)$$

Based on the isometry between the length of the neutral curve from the major axis to the point P and a corresponding arc length s on the hypothetical neutral circle, the relationship shown in formula (4a) is used to obtain the relationship between φ and θ as expressed by formula (4b).

$$s = \int_0^\theta \left(p + \frac{d^2 p}{d\theta^2}\right) d\theta \quad (4a)$$

$$= r_n \theta - \frac{3w}{2}\sin(2\theta)$$

$$= r_n \phi$$

$$\phi = \theta - 1.5\frac{w}{r_n}\sin(2\theta) \quad (4b)$$

A rotating Cartesian coordinate system (X, Y) also having origin O is then established, the system configured such that the Y-axis, on being rotated over a distance φ clockwise in relation to the y-axis, passes through point Q. The coordinates (x, y) are convened into the coordinates (X, Y) as indicated in formula (5).

$$X = x \cos\phi - y \sin\phi$$

$$Y = x \sin\phi + y \cos\phi \quad (5)$$

A tangent drawn on the neutral curve at a point P on the neutral curve forms an $x_F$ axis, and a line perpendicular to the $x_F$ axis forming a $y_F$ axis. A tooth profile of the flexible externally toothed gear 4 is applied to the coordinate system. The formula used to convert the above coordinate system to the stationary coordinate system (x, y) is formula (6) below, with reference being made to formula (2).

$$x = (r_n - 1.5w + y_F)\sin\theta - 0.5w \sin(3\theta) + x_F \cos\theta$$

$$y = (r_n + 1.5w + y_F)\cos\theta - 0.5w \cos(3\theta) - x_F \sin\theta \quad (6)$$

Substituting formula (6) into formula (5) yields, as shown below, a formula for converting the coordinates $(x_F, y_F)$ fixed to the teeth of the flexible externally toothed gear into values (X, Y) on the rotating coordinate system that moves over the hypothetical neutral circle (a derivation of the formula is shown in the end of the present specification).

$$X = x_F \cos(\theta - \phi) + (r_n + y_F)\sin(\theta - \phi) - 0.5w\{\sin(3\theta - \phi) + 3\sin(\theta + \phi)\}$$

$$Y = -x_F \sin(\theta - \phi) + (r_n + y_F)\cos(\theta - \phi) - 0.5w\{\cos(3\theta - \phi) - 3\cos(\theta - \phi)\} \quad (7)$$

A determination shall now be made of a movement locus as viewed From a hypothetical neutral circle, having an origin P on a coordinate system (P-$x_F$, $y_F$). In other words, $x_F = 0$ and $y_F = 0$ is used in formula (6), and formula (8) below is obtained with reference to formula (4)

$$X = r_n \sin\left\{1.5\frac{w}{r_n}\sin(2\theta)\right\} - 0.5w\left[\begin{array}{l}\sin\left\{2\theta + 1.5\frac{w}{r_n}\sin(2\theta)\right\} + \\ 3\sin\left\{2\theta - 1.5\frac{w}{r_n}\sin(2\theta)\right\}\end{array}\right] \quad (8)$$

$$Y = r_n \cos\left\{1.5\frac{w}{r_n}\sin(2\theta)\right\} - 0.5w\left[\begin{array}{l}\cos\left\{2\theta + 1.5\frac{w}{r_n}\sin(2\theta)\right\} - \\ 3\cos\left\{2\theta - 1.5\frac{w}{r_n}\sin(2\theta)\right\}\end{array}\right]$$

(Relative Movement of Flexible Externally Toothed Gear made with Respect to Rigid Internally Toothed Gear)

Formula (9) is used to determine the radius of curvature p at the point P on the neutral curve of the rim of the flexible externally toothed gear 4, based on a known formula for tangential polar coordinates.

$$\rho = p + \frac{d^2 p}{d\theta^2} = r_n - 3w\cos(2\theta) \tag{9}$$

Therefore, stationary coordinates $(x_R, y_R)$ of a curve center R of the neutral curve are obtained using formula (10) below, based on formula (6).

$$x_R = w[\{-1.5+3\cos(2\theta)\}\sin\theta - 0.5\sin(3\theta)] = -4w\sin^3\theta$$

$$y_R = w[\{1.5+3\cos(2\theta)\}\cos\theta - 0.5\cos(3\theta)] = 4w\cos^3\theta \tag{10}$$

The $y_F$ axis of the coordinate system $(P\text{-}x_F, y_F)$ is taken to be the top land center line for one tooth on the flexible externally toothed gear. The $y_F$ axis overlaps the y-axis in a position where $\theta=0$. A tooth at a point P defined by $\theta$ will now be considered. The movement of one tooth of the flexible externally toothed gear 4 is momentarily regarded as rotation at a hypothetical angular velocity of $\omega_{Fv}=v/\rho$ around a center of curvature R of the neutral curve. Here, assuming v to be the peripheral speed of rim neutral line, and to be $\omega_F$ is the angular velocity of the hypothetical neutral circle of the flexible externally toothed gear 4, it follows that the relationship $v=r_n\omega_F$ exists. The rotational speed of the corresponding D-side rigid internally toothed gear 2 is also $w_F$ because the flexible externally toothed gear 4 and the D-side rigid internally toothed gear 2 have the same number of teeth.

If a hypothetical number of teeth $z_{Fv}$ of the flexible externally toothed gear at the point P is introduced such that $z_{Fv}=z_F(\omega_F/\omega_{Fv})$, then $z_{Fv}$ is determined via formula (11) below with reference to formula (9).

$$z_{Fv} = z_F\left\{1 - \frac{3w}{r_n}\cos(2\theta)\right\}. \tag{11}$$

The D-side rigid internally toothed gear 2 also rotates around the point O at angular velocity $\omega_F$. A straight line connecting the point O and the center of curvature R is the momentary center line of the flexible externally toothed gear 4 and the D-side rigid internally toothed gear 2 in this case, and taking $\xi$ to be the angle at which the momentary center line forms the $-x$ axis, formula (12) below is established from formula (10).

$$\xi = \tan^{-}(\cos^3\theta) \tag{12}$$

The theoretical center distance $a_v$ in this case is determined using formula (13).

$$a_v = 2w\sqrt{1+3\cos^2(2\theta)} \tag{13}$$

Therefore, the relative momentary center S of both gears is assumed to be a point (pitch point) at which $a_v$ is externally divided in a ratio of $z_{Fv}$ and $z_F$, and the coordinates $(x_S, y_S)$ of the center are given by formula (14).

$$x_S = -2w\cos\zeta\sqrt{1+3\cos^2(2\theta)}\,\frac{z_F}{z_F - z_{Fv}} = -4w\sin^3\theta\frac{z_F}{z_F - z_{Fv}} \tag{14}$$

$$y_S = 2w\sin\zeta\sqrt{1+3\cos^2(2\theta)}\,\frac{z_F}{z_F - z_{Fv}} = 4w\cos^3\theta\frac{z_F}{z_F - z_{Fv}}$$

The relationship below, which is based on formula (12), is used in the formula above.

$$\sin\zeta = \frac{\cos^3\theta}{\sqrt{\sin^6\theta + \cos^6\theta}} = \frac{2\cos^3\theta}{\sqrt{1+3\cos^2(2\theta)}} \tag{15}$$

$$\cos\zeta = \frac{\sin^3\theta}{\sqrt{\sin^6\theta + \cos^6\theta}} = \frac{2\sin^3\theta}{\sqrt{1+3\cos^2(2\theta)}}$$

Hypothetical pitch radii $r_C$, $r_F$ for one tooth on each of the D-side rigid internally toothed gear 2 and the flexible externally toothed gear 4 are determined by formula (16) as line segments OQ, CQ, respectively.

$$r_C = a_v \frac{z_F}{z_F - z_{Fv}} \tag{16}$$

$$r_F = a_v \frac{z_{Fv}}{z_F - z_{Fv}}$$

It follows that the coordinates $(x_S, y_S)$ can be represented as a function of $\theta$, as expressed in formula (17).

$$x_S = -\frac{4r_n\sin^3\theta}{3\cos(2\theta)} \tag{17}$$

$$y_S = \frac{4r_n\cos^3\theta}{3\cos(2\theta)}$$

A condition for tooth profile contact is that a normal at contact point C of the tooth profile must pass through point S. Therefore, if a tooth profile is specified for the flexible externally toothed gear 4, a contact point can be established and the tooth profile of the corresponding D-side rigid internally toothed gear 2 can be determined under the condition that the normal to the tooth profile passes through point S of the corresponding instantaneous center in accordance with the position of point P.

(Imparting Convex Arcuate Tooth Profile to Flexible Externally Toothed Gear)

In the present invention, a convex arc is used for the main tooth profile (portion including the addendum surface) of the flexible externally toothed gear 4. $(x_a, y_a)$ are the coordinates of an arc center A of the convex arc in the coordinate system $(P\text{-}x_F, y_F)$, and r denotes the radius. The contact point C on the arcuate tooth profile of the flexible externally toothed gear 4 with respect to the tooth profile of the D-side rigid internally toothed gear is determined in relation to the momentary center S of relative momentary movement between the rotation movement of the coordinate system (O-X, Y) around the origin O of the D-side rigid internally toothed gear 2 and the momentary rotation around a momentary center R (regarded as the center of curvature of the neutral curve) of movement in the coordinate system of the flexible externally toothed gear, and is the point where a straight line that connects point S and the arc center A intersects the arc. The stationary coordinates $(x_A, y_A)$ of point A are determined using formula (18) based on formula (7).

$$x_A = (r_n - 1.5w + y_a)\sin\theta - 0.5w\sin(3\theta) + x_a\cos\theta$$

$$y_A = (r_n + 1.5w + y_a)\cos\theta - 0.5w\cos(3\theta) - x_a\sin\theta \quad (18)$$

It follows from the above that the coordinates of point C can be obtained using formula (19).

$$x_C = x_A + r\cos\eta \quad (19)$$

$$y_C = y_A + r\sin\eta$$

$$\eta = \tan^{-1}\left(\frac{y_A - y_S}{x_A - x_S}\right)$$

(Tooth Profile of D-Side Rigid Internally Toothed Gear)

The coordinates $(x_C, y_C)$ are determined using formula (19), with $\theta$ being used as a variable. Once the conversion has been made from the stationary coordinate system to the coordinate system fixed to the D-side rigid internally toothed gear 2, a tooth profile of a main part of the D-side internally toothed gear 2 in which the Y-axis is a tooth space center line is determined using formula (20), with reference being made to formula (4). The actual tooth profile of the D-side rigid internally toothed gear 2 is completed once a fillet curve has been added to the profile.

$$X = x_C \cos\phi - y_C \sin\phi$$

$$Y = x_C \sin\phi + y_C \cos\phi \quad (20)$$

Figure 4:
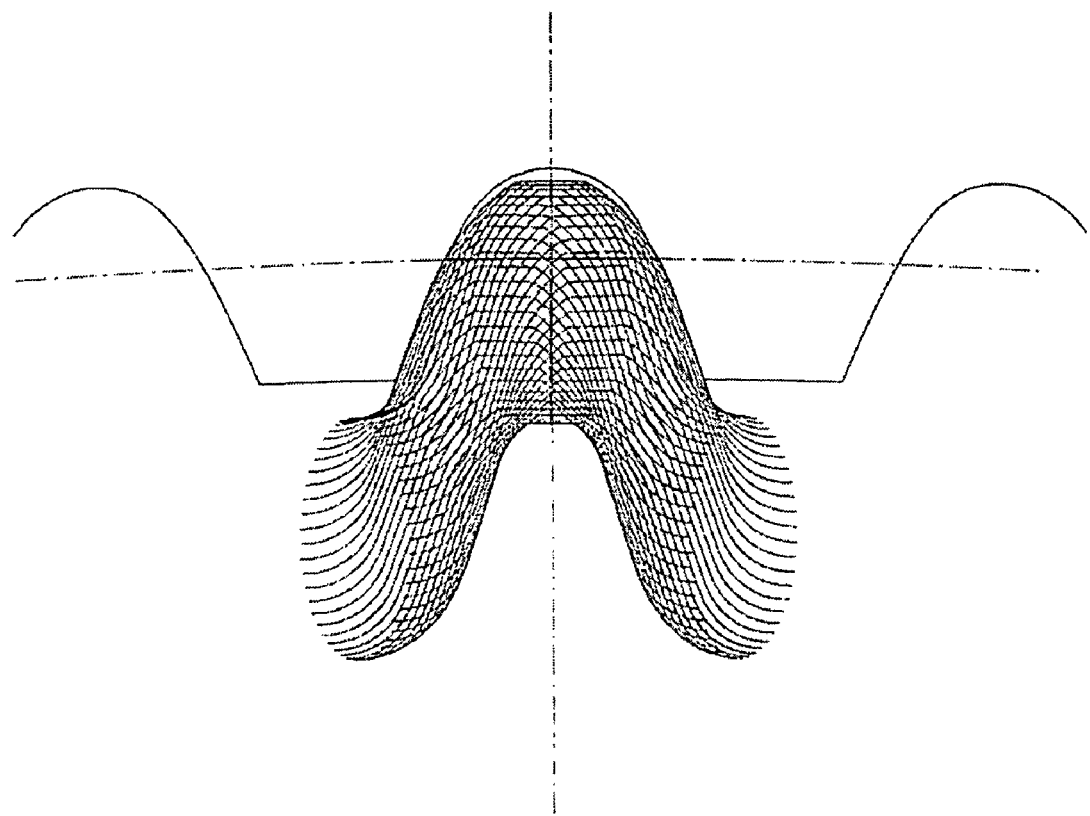
FIG. 4 is a descriptive diagram showing an example of a tooth profile of a D-side rigid internally toothed profile formed according to an arcuate tooth profile of a flexible externally toothed gear.

FIG. 4 is a diagram showing a tooth profile of the D-side rigid internally toothed profile 2 formed using a tooth of the flexible externally toothed gear 4, in a cross-section perpendicular to the axis. In the diagram, each gear has 100 teeth, and the flexing coefficient is 0.805.

Figure 5:
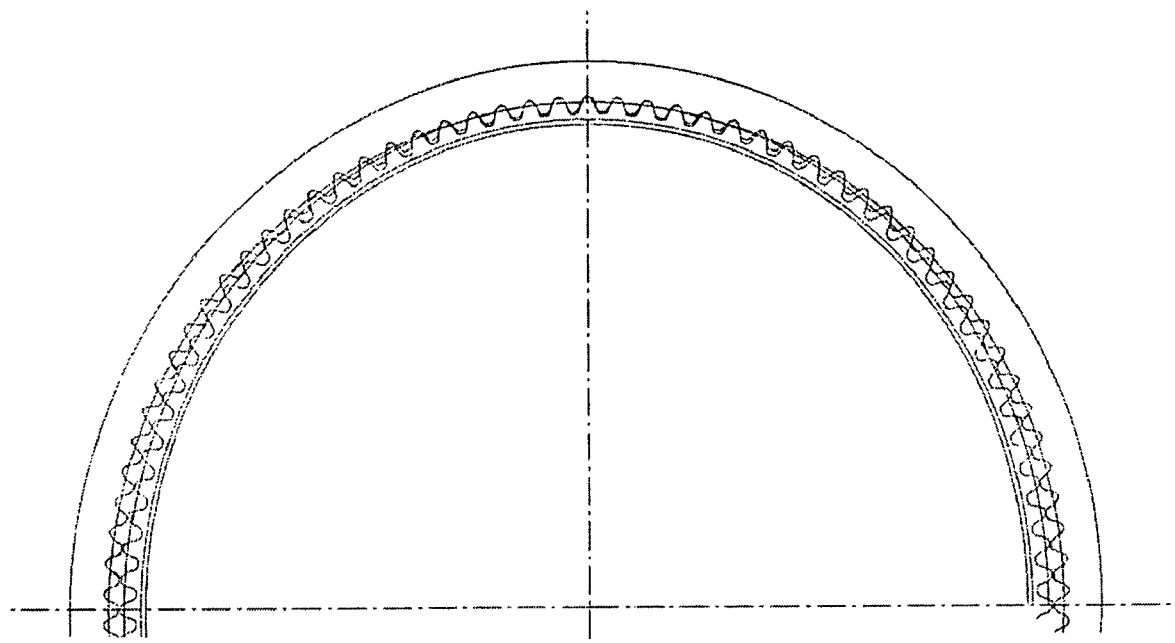
FIG. 5 is a descriptive diagram showing an example of meshing between gears of a flat wave gear device in which the tooth profile of FIG. 4 is used.

FIG. 5 shows an example of meshing between gears 2, 4 in a cross section given perpendicularly with respect to the axis of the D-side rigid internally toothed gear 2 in a flat wave gear device in which the tooth profile of FIG. 4 is used.

(Derivation of Formulae (2) and (7))

Derivation of formula (2) from formula (1)

$$\begin{aligned}x_p &= p\sin\theta - \left(-\frac{dp}{d\theta}\right)\cos\theta \quad (21)\\ &= \{r_n + w\cos(2\theta)\}\sin\theta - 2w\sin(2\theta)\cos\theta\\ &= r_n\sin\theta + w\{\cos(2\theta)\sin\theta - 2\sin(2\theta)\cos\theta\}\\ &= r_n\sin\theta + w[0.5\{\sin(3\theta) - \sin\theta\} - \{\sin(3\theta) + \sin\theta\}]\\ &= (r_n - 1.5w)\sin\theta - 0.5w\sin(3\theta)\end{aligned}$$

$$\begin{aligned}y_p &= p\cos\theta + \left(-\frac{dp}{d\theta}\right)\sin\theta\\ &= \{r_n + w\cos(2\theta)\}\cos\theta + 2w\sin(2\theta)\sin\theta\\ &= r_n\cos\theta + w\{\cos(2\theta)\cos\theta + 2\sin(2\theta)\sin\theta\}\\ &= r_n\cos\theta + w[0.5\{\cos(3\theta) + \cos\theta\} + \{-\cos(3\theta) + \cos\theta\}]\\ &= (r_n + 1.5w)\sin\theta - 0.5w\cos(3\theta)\end{aligned}$$

Derivation of formula (7) from formula (5) and formula (6)

$$\begin{aligned}X &= \{(r_n - 1.5w + y_F)\sin\theta - 0.5w\sin(3\theta) + x_F\cos\theta\}\cos\phi - \quad (22)\\ &\quad \{(r_n + 1.5w + y_F)\cos\theta - 0.5w\cos(3\theta) - x_F\sin\theta\}\sin\phi\\ &= x_F\cos(\theta - \phi) + (r_n + y_F)\sin(\theta - \phi) -\\ &\quad 0.5w\{\sin(3\theta - \phi) + 3\sin(\theta + \phi)\}\end{aligned}$$

$$\begin{aligned}Y &= \{(r_n - 1.5w + y_F)\sin\theta - 0.5w\sin(3\theta) + x_F\cos\theta\}\sin\phi +\\ &\quad \{(r_n + 1.5w + y_F)\cos\theta - 0.5w\cos(3\theta) - x_F\sin\theta\}\cos\phi\\ &= -x_F\sin(\theta - \phi) + (r_n + y_F)\cos(\theta - \phi) -\\ &\quad 0.5w\{\cos(3\theta - \phi) - 3\cos(\theta + \phi)\}\end{aligned}$$

The invention claimed is:

1. A method for setting a tooth profile in a flat wave gear device that has a D-side and an S-side rigid internally toothed gears disposed in parallel in a coaxial state with each other, an annular flexible externally toothed gear disposed in a coaxial state within the D-side and the S-side rigid internally toothed gears, and a wave generator for causing a cross-section of the flexible externally toothed gear given perpendicularly with respect to an axis thereof to flex elliptically and the resulting shape to rotate, the number of teeth on the D-side rigid internally toothed gear being the same as the number of teeth on the flexible externally toothed gear, and the number of teeth on the S-side rigid internally toothed gear having 2n more teeth (n being a positive integer) than the number of teeth on the flexible externally toothed gear, wherein the method is comprising:

using both the flexible externally toothed gear and the D-side rigid internally toothed gear as spur gears of module m;

using κmn (κ: flexing coefficient as the degree of radial flexing on a major axis of a rim neutral line passing through a center along a thickness direction of a tooth root rim when the cross-section of the flexible externally toothed gear given perpendicularly with respect to the axis is caused to deform into an elliptical shape;

giving a main part of a tooth profile of the flexible externally toothed gear a convex arcuate tooth profile composed of a convex arc having a radius r and point A as a center; determining a momentary center S of relative motion of the flexible externally toothed gear and the D-side rigid internally toothed gear generated accompanying rotation of the wave generator;

establishing a point at which a line segment that connects the arc center of the convex arc and the momentary center intersects the convex arc as a contact point C between the convex arcuate tooth profile of the flexible externally toothed gear and a tooth profile of the D-side rigid internally toothed gear; and using a movement locus of the contact point on the convex arcuate tooth profile of the flexible externally toothed gear accompanying rotation of the wave generator as a tooth profile of a main part of the D-side rigid internally toothed gear.

2. The method for setting a tooth profile of a flat wave gear device according to claim 1, the method comprising:

establishing a stationary Cartesian coordinate system (O-x, y) whose origin is a center O of the D-side rigid internally toothed gear;

using the formula below to determine p using tangential polar coordinates where $r_n$ is a radius of a neutral circle that is a neutral curve before deformation, w is a degree of flexing, θ is an angle at which a tangent to the neutral curve at a point P established on the neutral curve forms an x-axis, and p is a length of a normal oriented downward from origin O on the tangent;

$$p = r_n + w \cos(2\theta)$$

establishing a rotating Cartesian coordinate system (O-X, Y) that also has origin O, and is configured such that the Y-axis, on being rotated over a distance φ clockwise in relation to the y-axis, passes through a hypothetical point Q on the neutral circle corresponding to a point P on the neutral curve;

establishing a Cartesian coordinate system (P-$x_F$, $y_F$) in which a tangent drawn on the neutral curve at point P on the neutral curve is an $x_F$ axis, and a straight line perpendicular to the $x_F$ axis is a $y_F$ axis;

using the formula below to determine, as a function of θ, coordinates ($x_S$, $y_S$) of the momentary center S on the stationary Cartesian coordinate system (O-x, y);

$$x_S = -\frac{4r_n \sin^3 \theta}{3\cos(2\theta)}$$

$$y_S = \frac{4r_n \cos^3 \theta}{3\cos(2\theta)}$$

taking ($x_a$, $y_a$) as the coordinates of a center A of the convex arc on the Cartesian coordinate system (P-$x_F$, $y_F$), and using the formula below to determine coordinates ($x_A$, $y_A$) of the center A on the stationary Cartesian coordinate system (O-x, y);

$$x_A = (r_n - 1.5w + y_a) \sin \theta - 0.5 w \sin(3\theta) + x_a \cos \theta$$

$$y_A = (r_n + 1.5w + y_a) \cos \theta - 0.5w \cos(3\theta) - x_a \sin \theta$$

using the formula below to determine stationary coordinates ($x_C$, $y_C$) of the contact point C;

$$x_C = x_A + r \cos \eta$$

$$y_C = y_A + r \sin \eta$$

$$\eta = \tan^{-1}\left(\frac{y_A - y_S}{x_A - x_S}\right)$$

converting the stationary coordinates ($x_C$, $y_C$), determined using the above formula, from the stationary coordinate system (O-x, y) to the rotating coordinate system (O-X, Y) fixed to the D-side rigid internally toothed gear with θ being used as a variable, and using the formula below to determine the tooth profile of the main part of the D-side internally toothed gear wherein the Y-axis is the center of a tooth space.

$$X = x_C \cos \phi - y_C \sin \phi$$

$$Y = x_C \sin \phi + y_C \cos \phi.$$

3. The method for setting a tooth profile of a flat wave gear device according to claim 2, the method comprising:
setting the flexing coefficient κ to fall within a range expressed by 0.6<κ<1.4.

4. A flat wave gear device wherein a main part of a tooth profile of a flexible externally toothed gear and a main part of a tooth profile of a D-side rigid internally toothed gear are set using the method for setting a tooth profile of claim 1.

5. A flat wave gear device wherein a main part of a tooth profile of a flexible externally toothed gear and a main part of a tooth profile of a D-side rigid internally toothed gear are set using the method for setting a tooth profile of claim 2.

6. A flat wave gear device wherein a main part of a tooth profile of a flexible externally toothed gear and a main part of a tooth profile of a D-side rigid internally toothed gear are set using the method for setting a tooth profile of claim 3.

* * * * *